(12) United States Patent
Salter et al.

(10) Patent No.: US 11,505,233 B2
(45) Date of Patent: Nov. 22, 2022

(54) HEATED VEHICLE STEERING WHEEL HAVING MULTIPLE CONTROLLED HEATING ZONES

(71) Applicant: Ford Global Technologies, LLC, Dearborn, MI (US)

(72) Inventors: Stuart C. Salter, White Lake, MI (US); Pietro Buttolo, Dearborn Heights, MI (US); Manfred Koberstein, Troy, MI (US); Michael Blischke, Northville, MI (US); Katherine Howard-Cone, Canton, MI (US); James Robert Chascsa, II, Farmington Hills, MI (US); Daniel J. Martin, Plymouth, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 17/002,058

(22) Filed: Aug. 25, 2020

(65) Prior Publication Data
US 2022/0063700 A1  Mar. 3, 2022

(51) Int. Cl.
| | |
|---|---|
| B62D 1/06 | (2006.01) |
| B62D 1/04 | (2006.01) |
| B60R 11/04 | (2006.01) |
| H05B 3/34 | (2006.01) |
| H05B 1/02 | (2006.01) |
| B60R 11/00 | (2006.01) |

(52) U.S. Cl.
CPC .............. *B62D 1/065* (2013.01); *B60R 11/04* (2013.01); *B62D 1/046* (2013.01); *H05B 1/0236* (2013.01); *H05B 3/34* (2013.01); *B60R 2011/001* (2013.01); *H05B 2203/005* (2013.01)

(58) Field of Classification Search
CPC . B60R 11/04; B60R 2011/001; H05B 1/0236; H05B 2203/005; H05B 3/34; H05B 3/36; B62D 1/046; B62D 1/065
USPC ......................................................... 219/204
See application file for complete search history.

(56) References Cited

U.S. PATENT DOCUMENTS

| | | | |
|---|---|---|---|
| 6,392,195 B1 | 5/2002 | Zhao et al. | |
| 6,441,344 B1 | 8/2002 | Bonn et al. | |
| 6,815,642 B2 | 11/2004 | Haag et al. | |
| 7,019,261 B2 | 3/2006 | Worrell et al. | |
| 8,993,929 B2 | 3/2015 | Maranville et al. | |
| 10,449,989 B2 | 10/2019 | Nishio et al. | |
| 10,528,201 B2 | 1/2020 | Leigh et al. | |
| 2015/0336601 A1* | 11/2015 | Van'tZelfde | B62D 1/046 307/9.1 |

(Continued)

FOREIGN PATENT DOCUMENTS

WO          02094634 A1    11/2002

*Primary Examiner* — Dana Ross
*Assistant Examiner* — Joe E Mills, Jr.
(74) *Attorney, Agent, or Firm* — Vichit Chea; Price Heneveld LLP (57) ABSTRACT

A vehicle steering wheel is provided that includes a rim having a core structure, a plurality of heaters surrounding at least a portion of the core structure to define a plurality of heating zones, at least one sensor for sensing location of a user's hand on the steering wheel, and a controller controlling the plurality of heaters to activate one or more of the heaters based on the sensed location of the hand.

16 Claims, 10 Drawing Sheets

(56) References Cited

U.S. PATENT DOCUMENTS

| | | | |
|---|---|---|---|
| 2017/0060254 A1* | 3/2017 | Molchanov | G01S 7/415 |
| 2017/0355391 A1 | 12/2017 | Wittkowski et al. | |
| 2018/0229752 A1 | 8/2018 | Chascsa, II et al. | |
| 2019/0185039 A1 | 6/2019 | Park et al. | |
| 2019/0256125 A1 | 8/2019 | Ostrowski et al. | |
| 2020/0207358 A1* | 7/2020 | Katz | G01C 21/3697 |

* cited by examiner

HEATED VEHICLE STEERING WHEEL HAVING MULTIPLE CONTROLLED HEATING ZONES

FIELD OF THE DISCLOSURE

The present disclosure generally relates to vehicle steering wheels, and more particularly relates to heated steering wheels.

BACKGROUND OF THE DISCLOSURE

Motor vehicles are commonly equipped with a steering wheel that may be heated with an electric heater. The heater, typically in the form of an electric heater mat, generally extends over a substantial portion of the steering wheel rim such that a substantial portion of the steering wheel rim is heated when the heater is activated. However, it may be desirable to heat lesser portions of the steering wheel to reduce energy consumption, particularly for electric vehicles.

SUMMARY OF THE DISCLOSURE

According to a first aspect of the present disclosure, a vehicle steering wheel is provided. The vehicle steering wheel includes a rim having a core structure, a plurality of heaters surrounding at least a portion of the core structure to define a plurality of heating zones, at least one sensor for sensing location of a user's hand on the steering wheel, and a controller controlling the plurality of heaters to activate one or more of the plurality of heaters based on the sensed location of the hand.

Embodiments of the first aspect of the disclosure can include any one or a combination of the following features:
- the at least one sensor comprises at least one capacitive sensor located on the steering wheel;
- the at least one sensor comprises a plurality of capacitive sensors, wherein each heating zone has a capacitive sensor;
- the at least one capacitive sensor is located between the plurality of heaters and a cover wrap on the rim;
- the at least one sensor comprises an infrared imager for sensing thermal energy indicative of a location of the hand on the steering wheel;
- the at least one sensor comprises an imaging camera for capturing images of the steering wheel and identifying a location of a hand based on the captured images;
- a cover wrap surrounding a plurality of heaters;
- the cover wrap comprises one of leather and vinyl;
- each of the plurality of heaters comprises an electric heater mat; and
- the core structure comprises a rigid core and a surrounding compliant layer.

According to a second aspect of the present disclosure, a vehicle steering wheel is provided. The vehicle steering wheel includes a rim having a core structure and a cover wrap, a plurality of heaters surrounding at least a portion of the core structure to define a plurality of heating zones, wherein each of the plurality of heaters has an electric heater mat, at least one sensor for sensing location of a user's hand on the steering wheel, and a controller controlling the plurality of heaters to activate one or more of the plurality of heaters based on the sensed location of the hand.

Embodiments of the second aspect of the disclosure can include any one or a combination of the following features:
- the at least one sensor comprises at least one capacitive sensor located on the steering wheel;
- the at least one sensor comprises a plurality of capacitive sensors, wherein each heating zone has a capacitive sensor;
- the at least one capacitive sensor is located between the plurality of heaters and a cover wrap on the rim;
- the at least one sensor comprises an infrared imager for sensing thermal energy indicative of a location of the hand on the steering wheel;
- the at least one sensor comprises an imaging camera for capturing images of the steering wheel and identifying a location of a hand based on the captured images;
- the cover wrap surrounds the plurality of heaters;
- the cover wrap comprises one of leather and vinyl; and
- the core structure comprises a rigid core and a surrounding compliant layer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
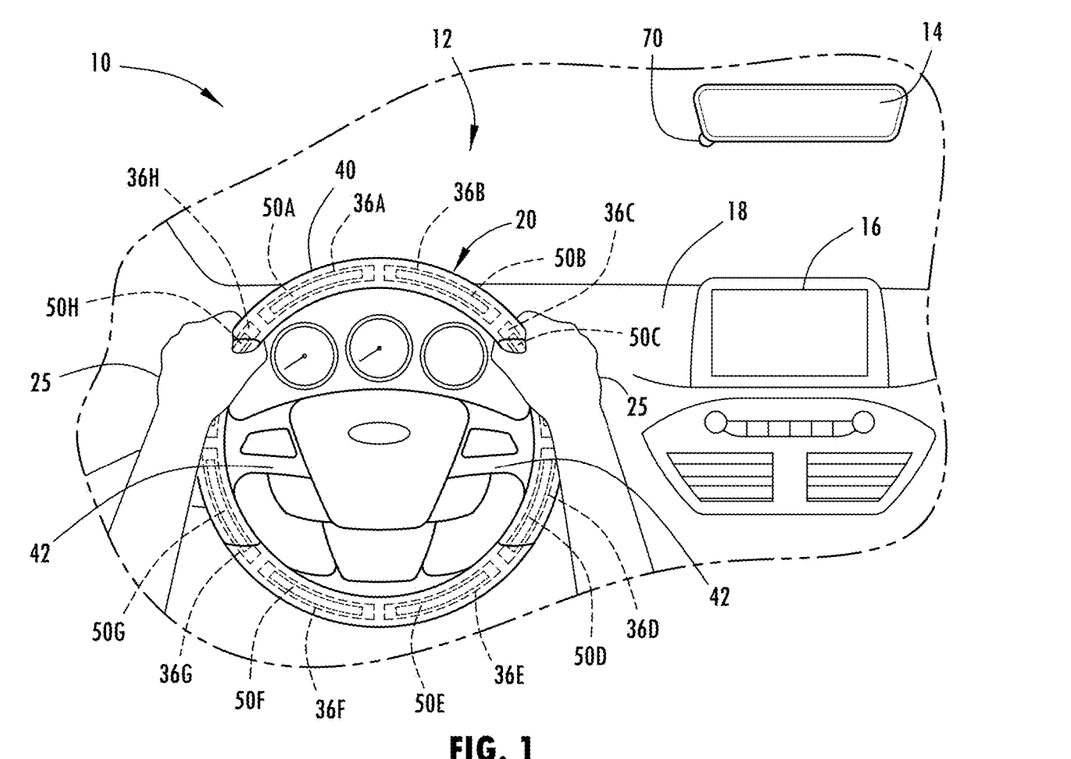
FIG. 1 is a front perspective view of the interior of an automotive vehicle having a heated steering wheel, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heated vehicle steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a heated steering wheel 20 is generally illustrated located in a motor vehicle 10. The heated steering wheel 20 includes a rim having a core structure, a plurality of heaters surrounding at least a portion of the core structure to define a plurality of heating zones, at least one sensor for sensing location of a user's hand on the steering wheel, and a controller controlling the plurality of heaters to activate one or more of the plurality of heaters based on the sensed location of the hand.

Referring to FIG. 1, the motor vehicle 10 is generally illustrated having the heated steering wheel 20, according to one embodiment. The vehicle 10 may be a wheeled motor vehicle having a steering wheel 20 for steering the direction of the steerable wheels, such as for a car, a truck, a van, a bus, a sport utility vehicle (SUV) or for steering other steerable vehicles having a steering wheel such as a boat. The vehicle 10 is shown having a body defining a passenger compartment 12 having one or more seats configured to seat one or more passengers. The steering wheel 20 is typically positioned in front of a driver's seat to enable the seated driver to engage and operate the steering wheel 20 with his or her hands 25 to rotate the steering wheel 20 in clockwise and counter clockwise directions. The steering wheel 20 is generally shown extending vehicle rearward from the dashboard 18 and is forward of a driver seat as is common in driver steered vehicles.

The vehicle 10 is further illustrated having a display 16, such as a touchscreen display, located on the dashboard 18 and generally positioned to be viewed by the driver of the vehicle. The display 16 may display various information including indications of the heating of the steering wheel. Further, a rearview mirror 14 is shown located above the dashboard 18 generally positioned near a forward windshield of the vehicle 10. One or more sensors, such as one or more imaging cameras, or one or more infrared sensing cameras may be located within the mirror 14 to sense location of the hand(s) of a user on the steering wheel, according to various embodiments.

Figure 2:
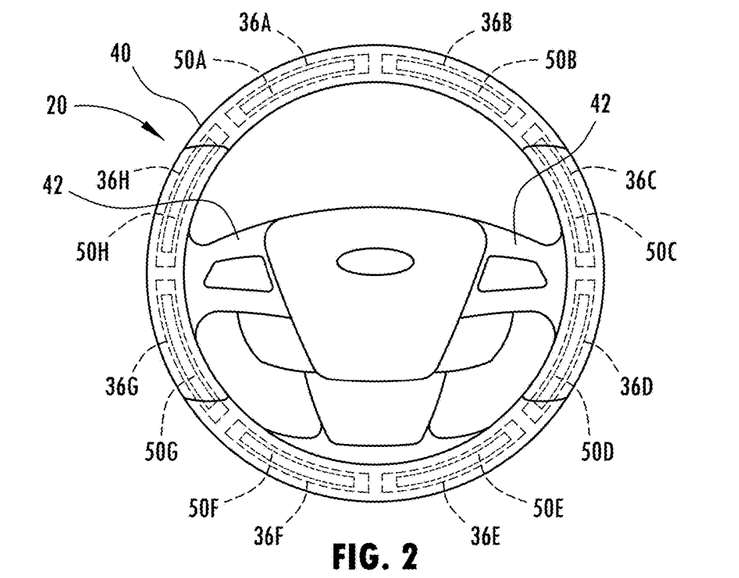
FIG. 2 is an enlarged view of the heated steering wheel which is equipped with a plurality of heaters and capacitive sensors, according to a first embodiment.

With particular reference to FIGS. 1 and 2, the steering wheel 20 is shown having a ring-shaped rim 40 and one or more spokes 42 or other connecting structure that interconnects the rim 40 with a steering wheel shaft that rotates with rotation of the steering wheel 20. A steering wheel angle sensor, such as an optical sensor, may be provided or coupled to the steering wheel shaft to sense rotational position of the steering wheel 20. Various components may be assembled onto the one or more spokes 42 including an operator actuatable horn, and other inputs, such as radio inputs, HVAC inputs, speed control inputs, and other controls.

The steering wheel 20 includes a plurality of heaters 36A-36H located at different angular positions on the rim 40. The plurality of heaters define a plurality of heating zones. The plurality of heaters 36A-36H are shown equiangularly disposed along the rim 40 of the steering wheel 20, according to one example. Each of the heaters 36A-36H may extend on a portion or the entire circumference of the steering wheel rim 40 such as on the front, back, top and bottom sides of the rim 40. Each of the plurality of heaters 36A-36H are independently energizeable via electric power to heat the corresponding heating zone which extends over a portion of the steering wheel 20.

Also disclosed on the rim 40 are a plurality of capacitive sensors 50A-50H for sensing an object, such as a user's hand or hands located on the rim 40 such as occurs when a user's hands grip the rim 40 or otherwise contact the rim 40. Each capacitive sensor 50A-50H is located in a corresponding heating zone defined by one of the electric heaters 36A-36H such that the capacitive sensors 36A-36H sense an object relative or proximate to one of the heaters 36A-36H. When one or more of the capacitive sensors 50A-50H sense an object indicative of a hand of a driver engaging the rim 40, a controller activates the corresponding one or more heaters so as to heat a portion only of the rim 40 where the hand is generally engaging the rim 40. For example, when a hand is detected engaging the rim by sensors 50C and 50H, the corresponding heaters 36C and 36H are energized and the remaining heaters are de-energized such that only the portion of the steering wheel rim 40 engaged by the hand is heated. This results in reduced electrical energy consumption, which is particularly useful for electric powered vehicles, but is also useful for conserving energy on gas powered vehicles.

Figure 3:
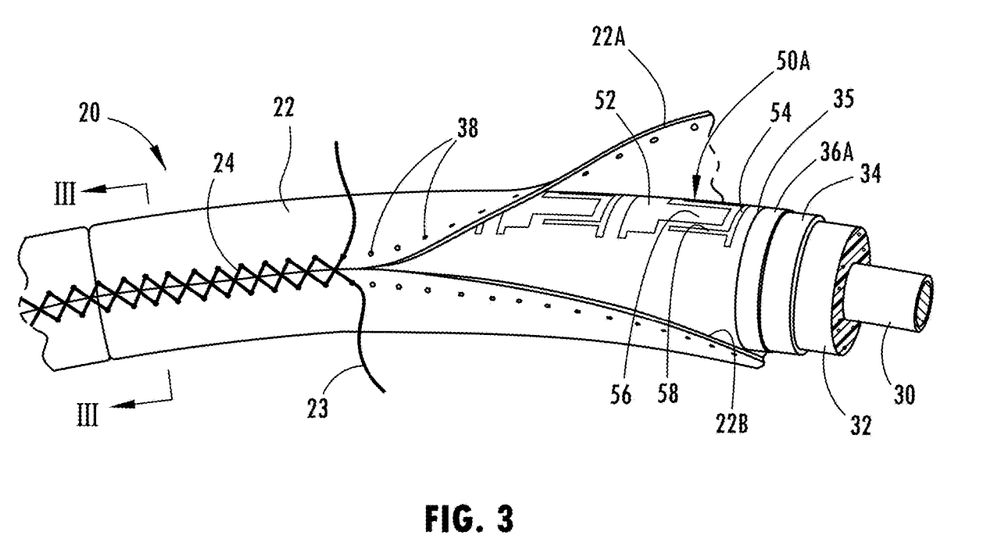
FIG. 3 is an enlarged view of a partially assembled portion of the heated steering wheel shown in FIG. 2.

Referring to FIG. 3, a portion of the ring-shaped rim 40 of the steering wheel 20 is generally illustrated partially assembled so as to illustrate the various layers of the steering wheel 20. The steering wheel 20 includes a rigid core 30 which is shown in a generally cylindrical shape which may be made of magnesium or aluminum, according to some examples. The core 30 may also be referred to as an armature for providing structural support and shape to the steering wheel 20. Surrounding the core 30 is a compliant layer 32 that may be made of polyurethane or foam. The compliant layer 32 may have a generally cylindrical shape and provides compressibility with memory that allows for a soft or cushioned feel to the steering wheel 20. The compliant layer 32 and core 30 together provide a core structure of the steering wheel 20.

Figure 4:
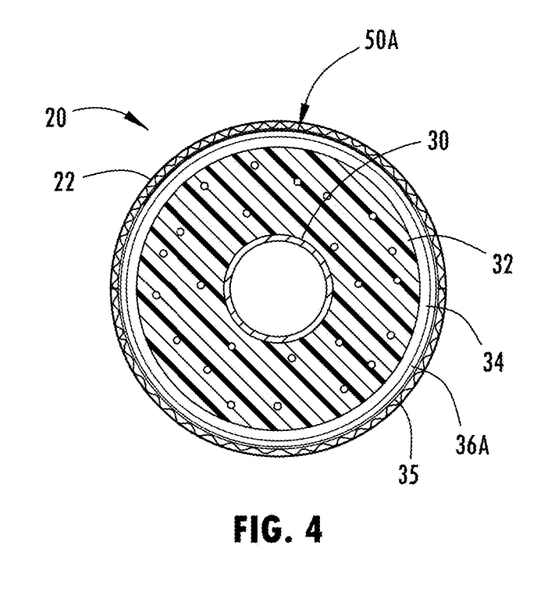
FIG. 4 is a cross-sectional view taken through line of FIG. 3 further illustrating the layers of the steering wheel.

A thermal insulative dielectric layer 34 may be disposed on top of the compliant layer 32. The plurality of electric powered heaters 36A-36H are disposed or wrapped around dielectric layer 34. Each of the electric powered heaters 36A-36H extends throughout a respective heating zone of the rim 40. According to one embodiment, the heaters 36A-36H are electric powered heating mats that may be powered via electricity provided by the one or more vehicle batteries, for example. The plurality of heaters 36A-36H may extend around a substantial portion of the core structure to define the heated portions of the steering wheel 20 when the corresponding heaters are activated for each heating zone. An electrically non-conductive dielectric layer 35 is disposed on top of the plurality of heaters 36A-36H. Dielectric layer 35 may extend over all of the heaters 36A-36H so as to provide a backing for an overlaid cover wrap and capacitive sensors and dielectrically isolate the heaters. The dielectric layer 35 may include a thin electrically/dielectric sheet of material, such as fleece or polyester that covers the heaters 36A-36H and allows thermal energy (heat) to pass through to the cover wrap 22. The dielectric layer 35 may provide thermal conductivity for enhanced thermal transmission.

The plurality of capacitive sensors 50A-50H are disposed on top of dielectric layer 35 generally over at least a portion of the corresponding heaters 36A-36H. Each of the capacitive sensors 36A-36H may be configured as mutual capacitive sensors having first and second capacitive electrodes 52 and 54 arranged within a common layer and dielectrically isolated from one another via a separation distance. The first electrode 52 has a first plurality of conductive fingers 56 and the second electrode 54 has a second plurality of conductive fingers 58. The first plurality of conductive fingers 56 and the second plurality of conductive fingers 58 are interdigitated or interleaved with one another. One of the first and second electrodes is driven with a drive signal and the other of the first and second electrodes generates a receive signal when operated in a mutual capacitance mode. The drive electrode may receive square wave drive pulses applied at a voltage $V_I$. The receive electrode may have an output for generating an output voltage $V_O$. It should be appreciated that the first and second electrodes 52 and 54 may be arranged in various other configurations for generating a capacitive electric field as an activation field and that other types of capacitive sensors such as self-capacitive sensors may be employed.

The drive electrode is applied with voltage input $V_I$ and square wave pulses having a charge pulse cycle sufficient to charge the receive electrode to a desired voltage. The receive electrode thereby serves as a measurement and electrode. When a user or operator, such as a user's hand, enters the activation electric field generally proximate to the sensor, the sensor assembly detects the disturbance caused by the finger to the activation electric field and determines whether the disturbance is sufficient to detect a hand located on the steering wheel rim 40. The disturbance of the activation electric field is detected by processing the charge pulse signal associated with the corresponding signal.

A cover wrap 22 is provided over the top of the plurality of capacitive sensors 50A-50H completely covering the core structure of the rim 40. The cover wrap 22 may be stitched together along a stitch seam 24 where first and second edges of the cover wrap 22 may abut one another and are joined together along the stitch seam 24. The stitch seam 24 may include stitching 23 extending through holes 38. It should be appreciated that the cover wrap 22 may include leather, according to one example, or vinyl, according to another example.

The plurality of heaters 36A-36H each may include single layer heaters with electrically conductive heating material, such as copper wire sewn into a printed-on layer, according to one embodiment. The heaters 36A-36H may each include multiple layers forming the heater as a mat, according to another embodiment. In a multiple layer heater, the electrically conductive heating material may be fabricated on one side or between multiple layers.

Figure 5:
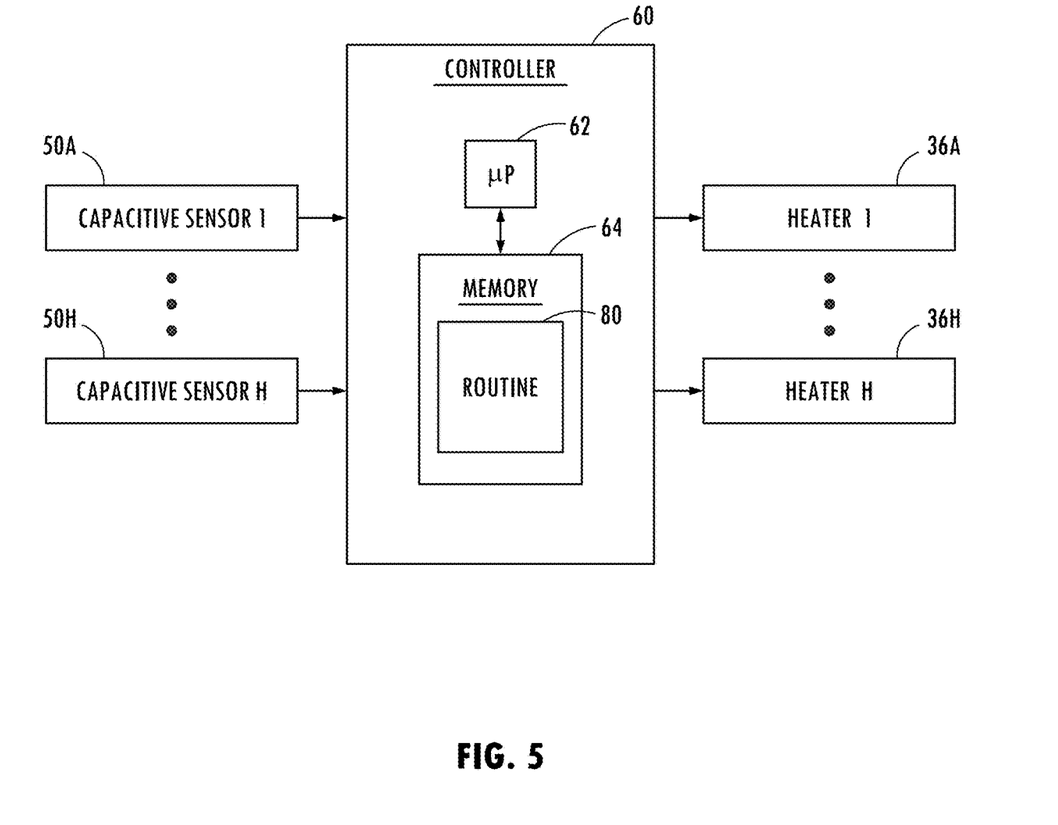
FIG. 5 is a block diagram illustrating a controller for controlling the plurality of heaters on the steering wheel, according to the first embodiment.

Referring to FIG. 5, a controller 60 is generally illustrated for controlling activation of the plurality of heaters 36A-36H based on sensor outputs received from the plurality of capacitive sensors 50A-50H. The controller 60 may include a microprocessor 62 and memory 64 configured with one or more routines 80. The controller 60 may be a micro control unit (MCU) having firmware, according to one example. It should be appreciated that other analog and/or digital circuitry may be used to provide the controller 60. The controller 60 receives inputs from each of the capacitive sensors 50A-50H and processes the inputs to determine the detection of an object, such as a user's hand, on the corresponding sensed portion of the rim of the steering wheel. When a user's hand is detected by one or more of the capacitive sensors 50A-50H, the corresponding heaters associated with the same heating zone of the rim are activated so as to heat only those heating zones of the rim where a hand is detected. For example, when only capacitive sensor 50A detects a placement of a hand on the rim, heater 36A is activated and the remaining heaters 36B-36H are deactivated.

Figure 6:
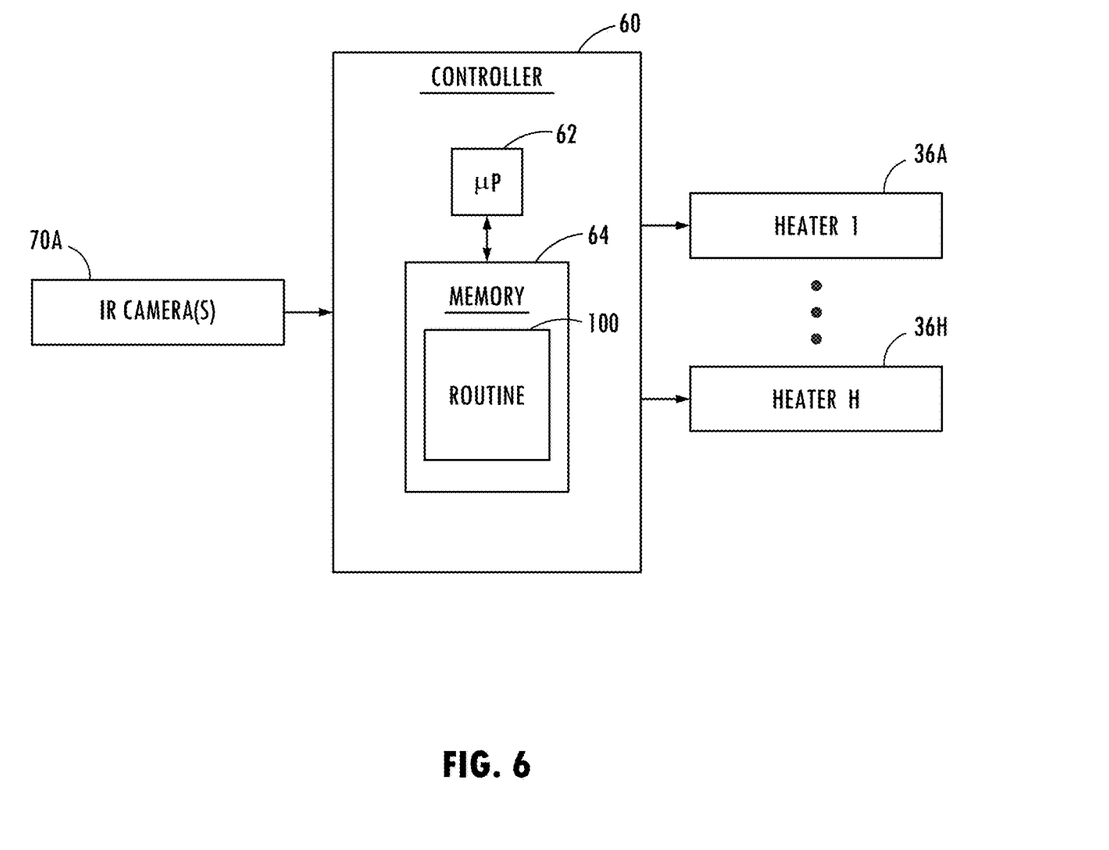
FIG. 6 is a block diagram illustrating a controller for controlling the plurality of heaters on the steering wheel using one or more IR cameras, according to a second embodiment.

Referring to FIG. 6, a controller 60 is illustrated for controlling the plurality of heaters 36A-36H on the rim 40 of the steering wheel based on signals detected by one or more infrared (IR) cameras 70A, according to a second embodiment. One or more IR cameras 70A may be located in the vehicle 10 such as on the rearview mirror 14 as shown by imager 70 in FIG. 1. The IR cameras 70A or located and oriented to detect infrared radiation or thermal energy from an area proximate to the steering wheel 20 so as to enable the determination of the location of one or more hands 25 on the steering wheel 20. When the controller 60 determines one or more hands 25 are located at certain locations on the steering wheel 20, the controller 60 energizes only those heaters 36A-36H located at the detected locations of the hand(s). This may be achieved by executing a routine 100 stored in memory with the microprocessor 62.

Figure 7:
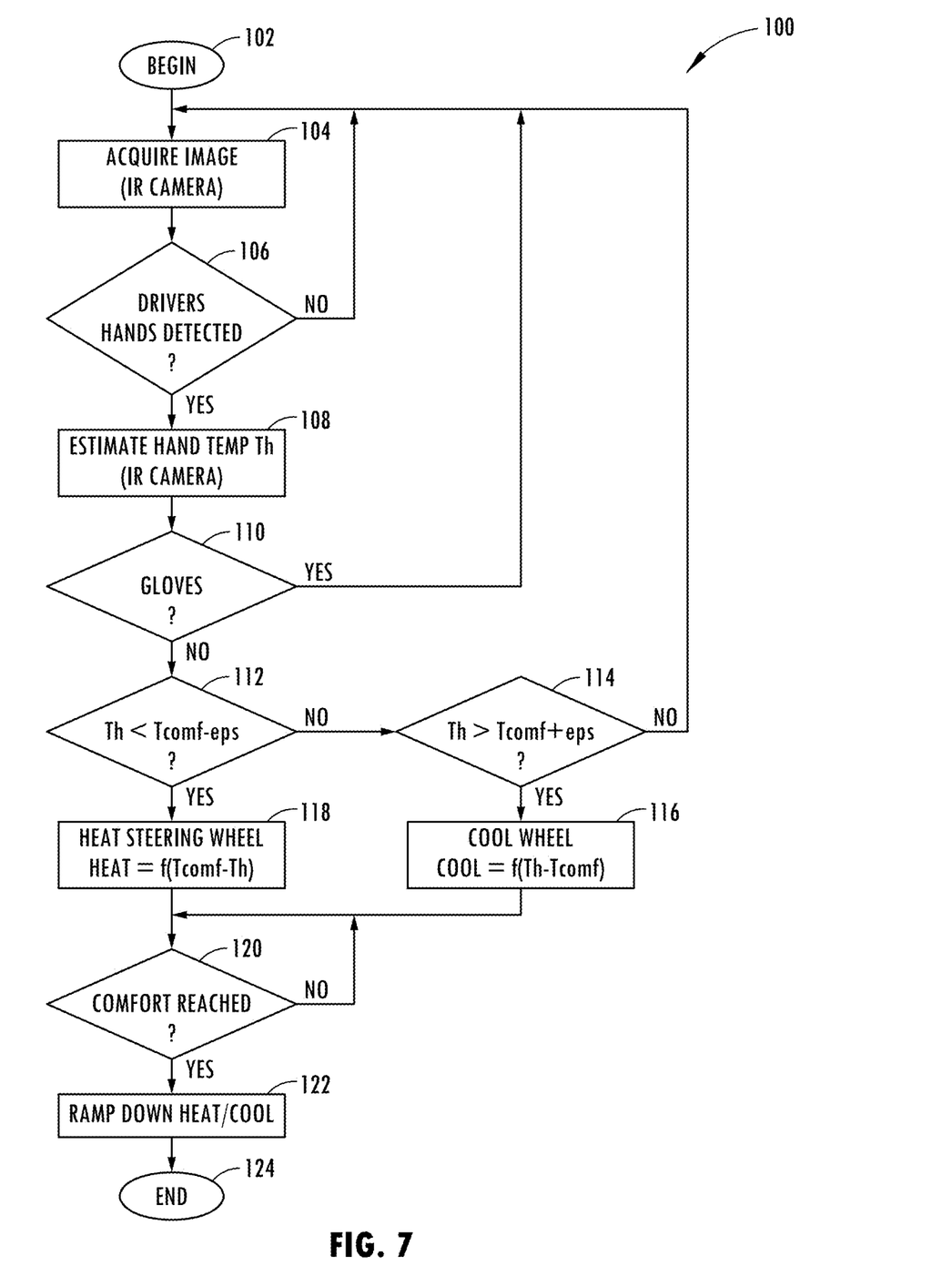
FIG. 7 is a flow diagram illustrating a routine for controlling the steering wheel heaters, according to the second embodiment.

Referring to FIG. 7, the routine 100 for controlling the plurality of heaters 36A-36H based on sensed thermal energy detected with one or more IR cameras is illustrated, according to the second embodiment. Routine 100 begins at step 102 and proceeds to step 104 to acquire image data using the IR camera which is operatively directed toward the steering wheel. Routine 100 next determines at step 106 if the driver's hands are detected with the acquired thermal image data and, if not, returns to step 104. If the driver's hands are detected on the steering wheel, routine 100 proceeds to step 108 to estimate the hand temperature Th from the IR camera data. Next, at decision step 110, routine 100 determines if gloves are detected worn by the user on top of their hands and, if so, returns to step 104. If no gloves are detected worn on the user's hands, routine 100 proceeds to step 112 to determine if the estimated hand temperature Th is less than a temperature Tcomf–eps, where Tcomf is a comfort temperature. If the estimated hand temperature Th is less than Tcomf–eps, routine 100 proceeds to step 118 to selectively energize one or more heater zones on the steering wheel with one or more of the heaters 36A-36H where the hand is detected on the rim of the steering wheel. Thus, the heat generated on the steering wheel is a function of Tcomf-Th. If, in decision step 112, the estimated hand temperature Th is not less than Tcomf–eps, routine 100 proceeds to decision step 114 to determine if the estimated hand temperature Th is greater than Tcomf+eps and, if not, returns to step 104. If the estimate hand temperature is greater than Tcomf+eps, routine 100 proceeds to step 116 to cool the steering wheel by turning off the energized heaters.

Routine 100 then proceeds to step 120 to determine if a comfort level for the steering wheel has been reached and, if not, waits until further proceeding. Once the comfort level has been reached, routine 100 proceeds to step 122 to ramp down the heating or cooling and ends thereafter at step 124.

Additionally, the presence of a steering wheel cover extending over the steering wheel rim 40 may be detected and used to adjust settings for controlling the heaters.

Figure 8:
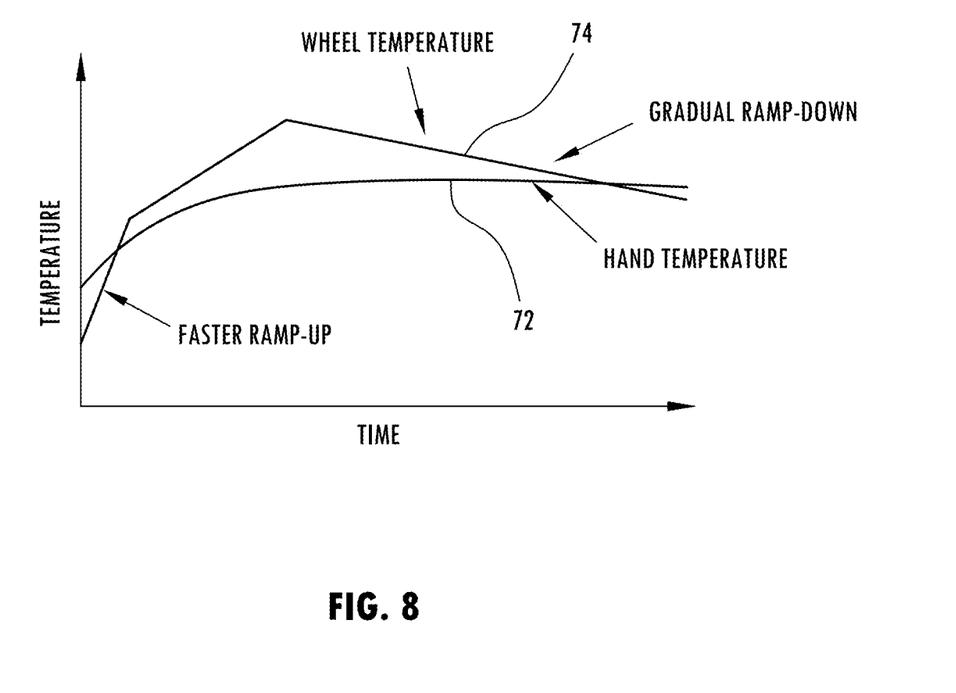
FIG. 8 is a graph illustrating temperature sensing with the IR camera(s), according to the second embodiment.

It should be appreciated that the one or more IR cameras may be located at various locations of the vehicle and may detect temperature of the various locations along the steering wheel. As seen in FIG. 8, the sensed temperature of a user's hand is shown by line 72 whereas the temperature of the steering wheel itself is as shown by line 74. As the steering wheel temperature 74 ramps up fast, the hand temperature 72 will start to rise and as the wheel temperature 74 drops, the hand temperature 72 will continue to more slowly gradually ramp. By processing the sensed temperatures of the hand and the steering wheel, a controlled temperature of a steering wheel may be achieved.

Figure 9:
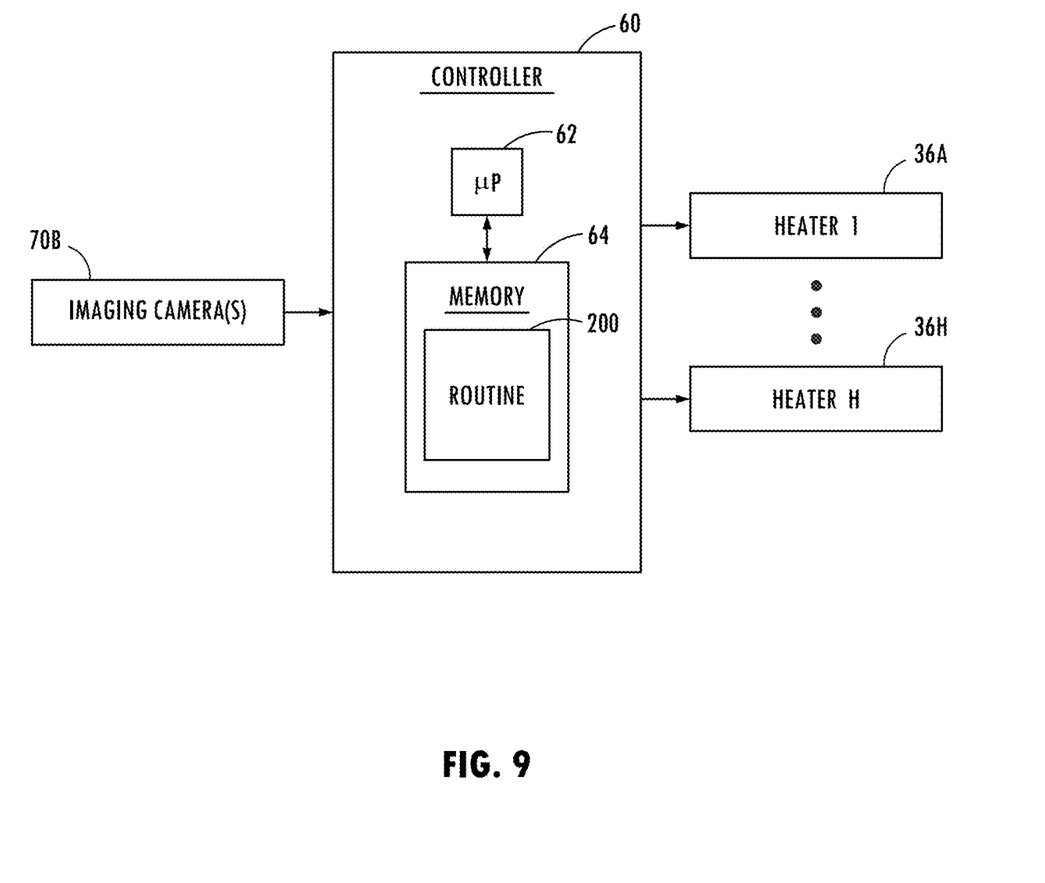
FIG. 9 is a block diagram illustrating a controller for controlling the plurality of heaters on the steering wheel using one or more imaging cameras, according to a third embodiment.

Referring to FIG. 9, a controller 60 is illustrated controlling the one or more heaters 36A-36H based on sensed imaging cameras 70B, according to a third embodiment. In this embodiment, one or more imaging cameras 70B are located in the vehicle, such as in the rearview mirror 14 as seen by imager 70 in FIG. 1 and are oriented to capture images of the steering wheel 20. The controller 20 may process the captured images and detect the location of one or more hands on the steering wheel 20 based on known images using image processing. Accordingly, the controller may determine the location of one or more hands on the steering wheel and may control the plurality of heaters 36A-36H to activate only those heaters in the heating zones where one or more hands are located on the steering wheel rim 40.

Figure 10:
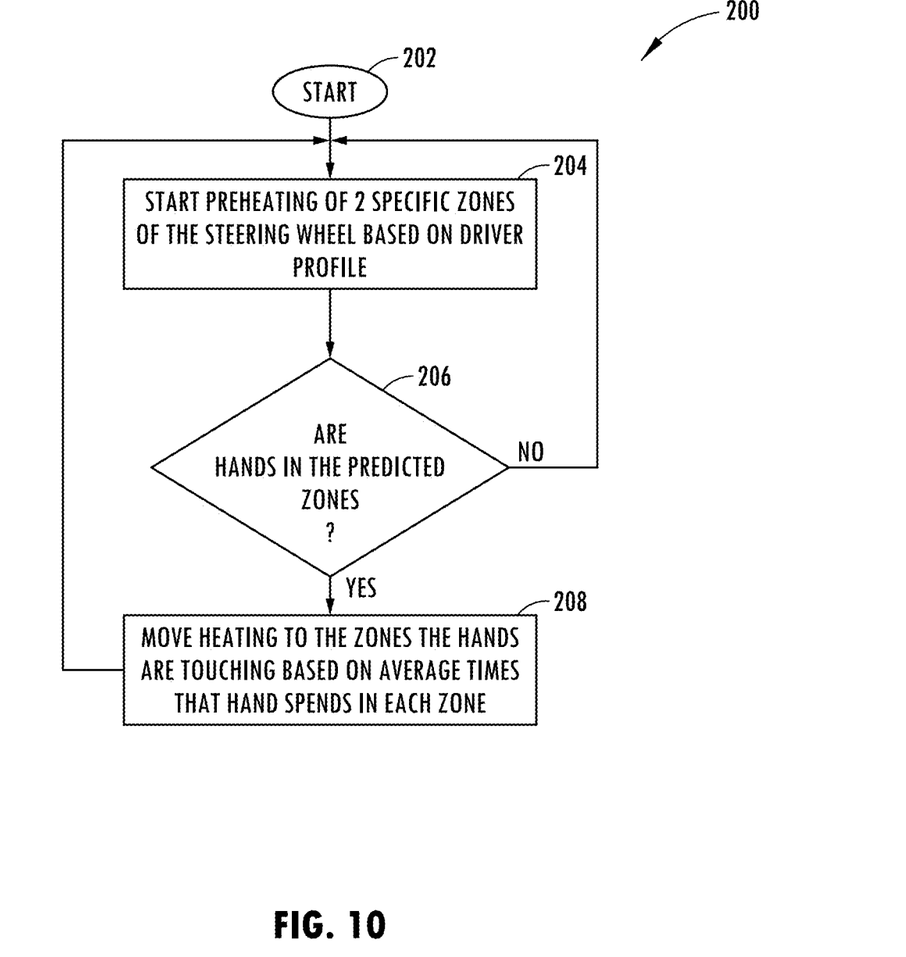
FIG. 10 is a flow diagram illustrating a routine for controlling the steering wheel heaters, according to another embodiment.

Referring to FIG. 10, routine 200 is illustrated for controlling the plurality of heaters based on a driver profile and average hand location. Routine 200 starts at step 202 and proceeds to step 204 to start preheating of two specific zones of the steering wheel based on a driver profile. Next, routine 200 proceeds to decision step 206 to determine if the user's hands are detected in the predicted zones and, if not, returns to step 206. If the user's hands are detected in the predicted zone, routine 200 proceeds to step 208 to activate heating of the heating zones where the hands are touching the steering wheel rim based on the updated average times that the hand spends in each heating zone.

Figure 11:
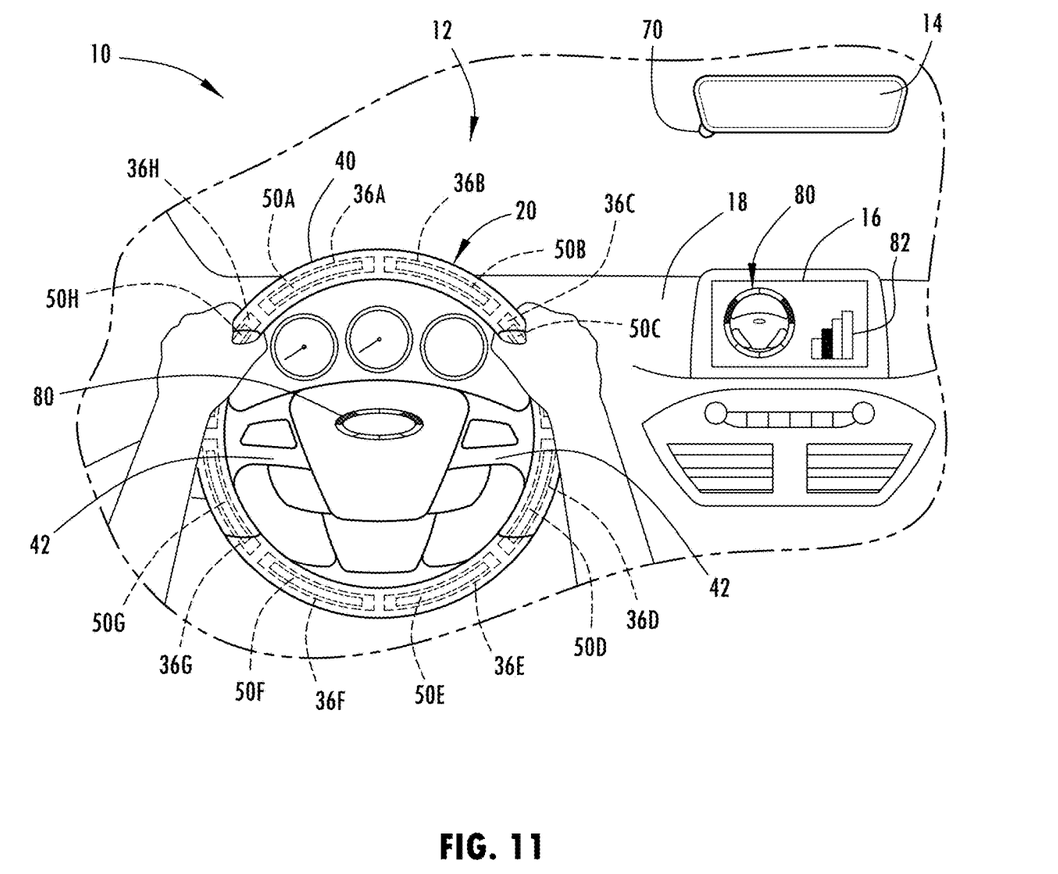
FIG. 11 is a front perspective view of the interior of an automotive vehicle having the heated steering wheel and indicators for indicating the heating status.
Figure 12:
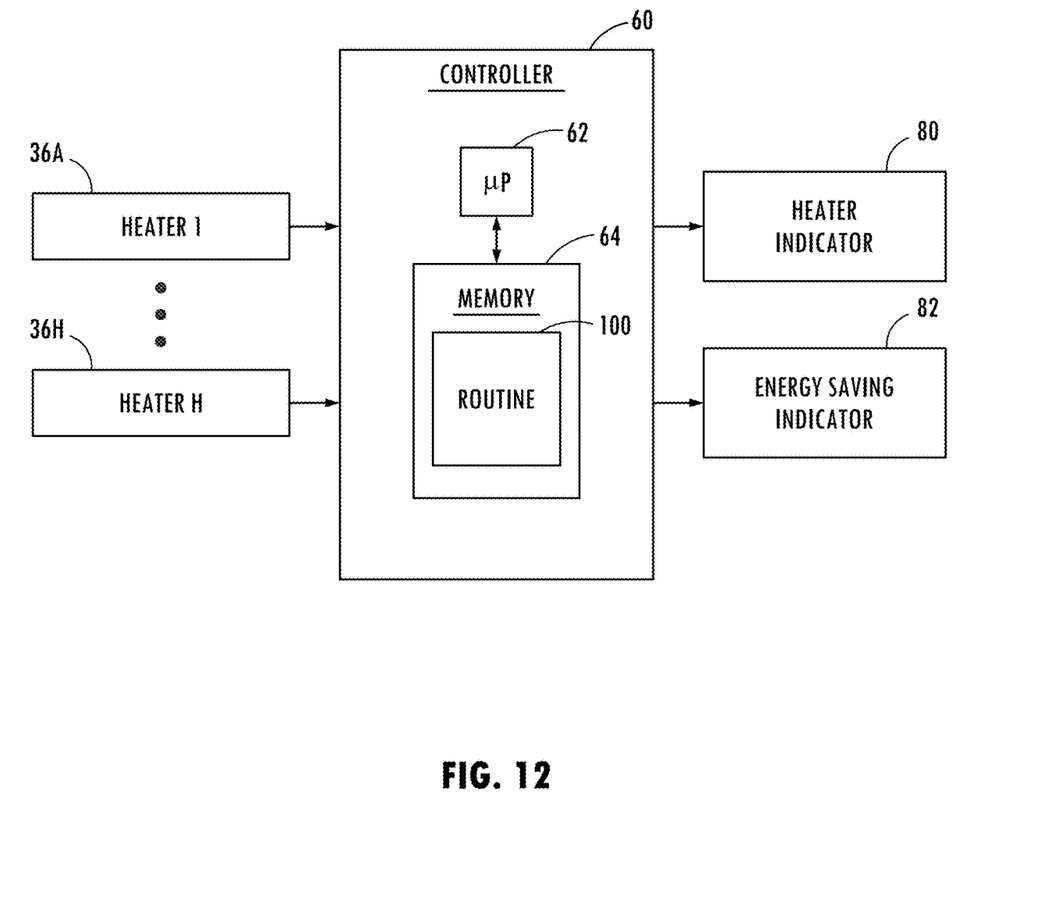
FIG. 12 is a block diagram illustrating a controller for controlling the heater indication and energy saving indication, according to one embodiment.

Referring to FIGS. 11 and 12, the vehicle 10 is further illustrated having one or more indicators, such as indicator 80 located on the display 16 and on the central spoke of the steering wheel 20. The indicator 80 may include an icon having illuminable portions that would indicate which heating zones are activated. As such, individual heating bars represent the heating zones and may be activated a certain color, such as green when they are turned on and may be activated with a different color red when turned off. As such, controller 60 may control a heater indicator to indicate which heating zones are activated and which heating zones are not activated. In addition, controller 60 may activate an energy savings indicator 82 shown on the display 16 to indicate the energy savings by activating only some of the heating zones. The energy savings indicator may be an illuminated bar indicator or any other indicator. It should be appreciated that manual control inputs may be available to allow a user to override the heater control to activate one or more heaters manually. Such inputs could be achieved by touching the heater bars on the heater indicator 80 on a touchscreen display.

Accordingly, the vehicle steering wheel 20 advantageously employs a plurality of heaters 36A-36H surrounding at least a portion of the core structure of the steering wheel 20 to define a plurality of heating zones and employs one or more sensors to sense the location of the user's hands on the steering wheel and controls the plurality of heaters to activate the one or more selected heaters based on the sensed location of the hand. This advantageously consumes a minimal amount of power necessary to heat the steering wheel without wasting energy, thereby conserving electrical power.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle steering wheel comprising:
   a rim having a core structure;
   a plurality of heaters surrounding at least a portion of the core structure to define a plurality of heating zones;
   at least one sensor for sensing location of a user's hand on the steering wheel, wherein the at least one sensor comprises an infrared imager for sensing thermal energy indicative of a location of the hand on the steering wheel; and
   a controller controlling the plurality of heaters to activate one or more of the plurality of heaters based on the sensed location of the hand.

2. The vehicle steering wheel of claim 1, wherein the at least one sensor comprises at least one capacitive sensor located on the steering wheel.

3. The vehicle steering wheel of claim 2, wherein the at least one sensor comprises a plurality of capacitive sensors, wherein each heating zone has a capacitive sensor.

4. The vehicle steering wheel of claim 3, wherein the at least one capacitive sensor is located between the plurality of heaters and a cover wrap on the rim.

5. A vehicle steering wheel comprising:
   a rim having a core structure;
   a plurality of eaters surrounding at least a portion of the core structure to define a plurality of heating zones;
   at least one sensor for sensing location of a user's hand on the steering wheel, wherein the at least one sensor comprises an imaging camera for capturing images of the steering wheel and identifying a location of a hand based on the captured images; and
   a controller controlling the plurality of heaters to activate one or more of the plurality of heaters based on the sensed location of the hand.

6. The vehicle steering wheel of claim 1 further comprising a cover wrap surrounding a plurality of heaters.

7. The vehicle steering wheel of claim 6, wherein the cover wrap comprises one of leather and vinyl.

8. The vehicle steering wheel of claim 1, wherein each of the plurality of heaters comprises an electric heater mat.

9. The vehicle steering wheel of claim 1, wherein the core structure comprises a rigid core and a surrounding compliant layer.

10. A vehicle steering wheel comprising:
    a rim having a core structure and a cover wrap;
    a plurality of heaters surrounding at least a portion of the core structure to define a plurality of heating zones, wherein each of the plurality of heaters has an electric heater mat;
    at least one sensor for sensing location of a user's hand on the steering wheel, wherein the at least one sensor comprises at least one of an infrared imager for sensing thermal energy indicative of a location of the hand on the steering wheel and an imaging camera for capturing images of the steering and identifying a location of the hand based on the captured images; and
    a controller controlling the plurality of heaters to activate one or more of the plurality of heaters based on the sensed location of the hand.

11. The vehicle steering wheel of claim 10, wherein the at least one sensor comprises at least one capacitive sensor located on the steering wheel.

12. The vehicle steering wheel of claim 11, wherein the at least one sensor comprises a plurality of capacitive sensors, wherein each heating zone has a capacitive sensor.

13. The vehicle steering wheel of claim 12, wherein the at least one capacitive sensor is located between the plurality of heaters and a cover wrap on the rim.

14. The vehicle steering wheel of claim 10, wherein the cover wrap surrounds the plurality of heaters.

15. The vehicle steering wheel of claim 14, wherein the cover wrap comprises one of leather and vinyl.

16. The vehicle steering wheel of claim 10, wherein the core structure comprises a rigid core and a surrounding compliant layer.

* * * * *

UNITED STATES PATENT AND TRADEMARK OFFICE
CERTIFICATE OF CORRECTION

| | |
|---|---|
| PATENT NO. | : 11,505,233 B2 |
| APPLICATION NO. | : 17/002058 |
| DATED | : November 22, 2022 |
| INVENTOR(S) | : Salter et al. |

It is certified that error appears in the above-identified patent and that said Letters Patent is hereby corrected as shown below:

In the Claims

Column 9:
Claim 5, Line 39;
"eaters" should be --heaters--.

Column 10:
Claim 10, Line 24;
After "steering" insert --wheel--.

Signed and Sealed this
Seventh Day of February, 2023

*Katherine Kelly Vidal*

Katherine Kelly Vidal
*Director of the United States Patent and Trademark Office*